C. H. FOX.
MITER BOX SAW GUIDE.
APPLICATION FILED APR. 18, 1908.
905,067.
Patented Nov. 24, 1908.
2 SHEETS—SHEET 2.
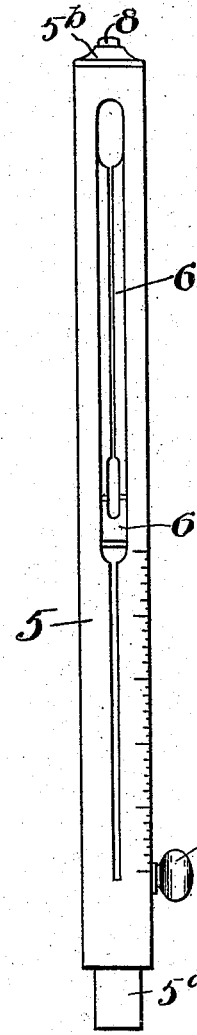
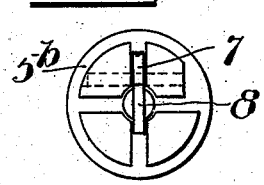
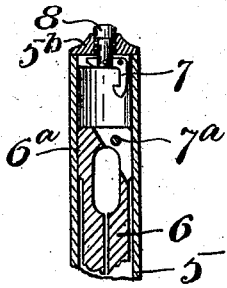
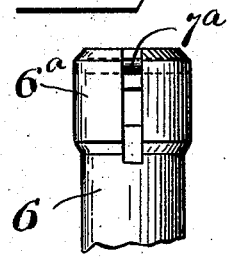
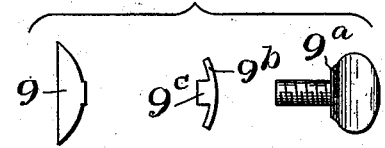
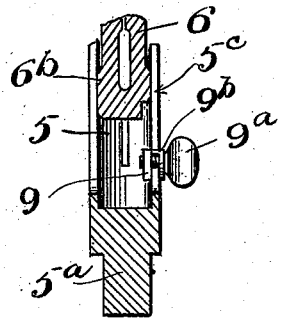
Witnesses:
Inventor
CHARLES H. FOX
By his Attorneys

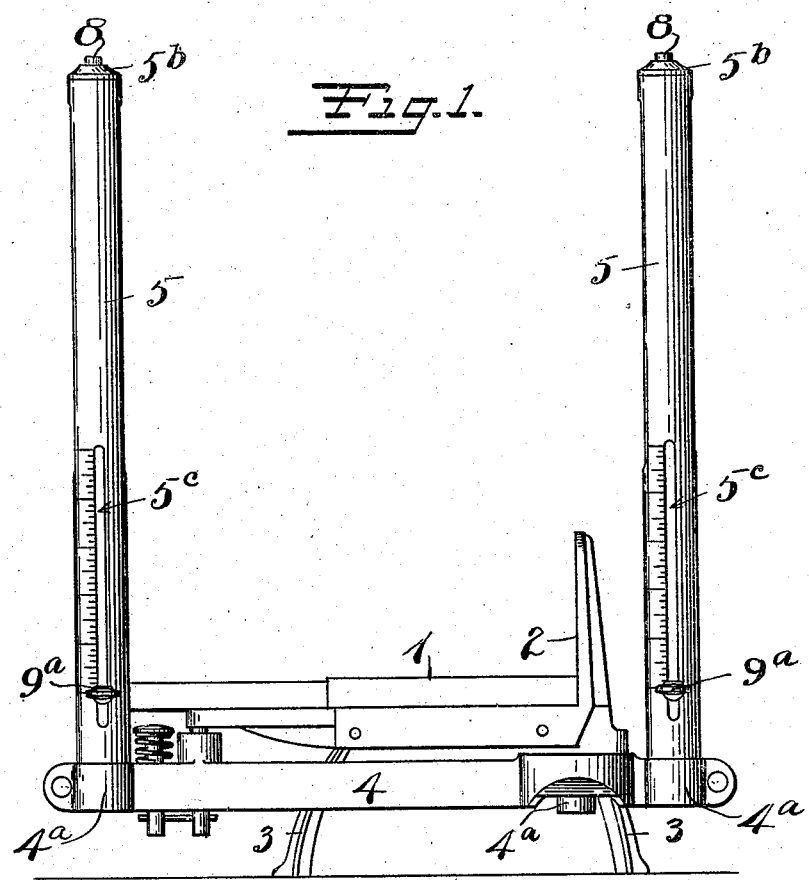

UNITED STATES PATENT OFFICE.

CHARLES H. FOX, OF NEW BRITAIN, CONNECTICUT, ASSIGNOR TO THE STANLEY RULE & LEVEL COMPANY, OF NEW BRITAIN, CONNECTICUT, A CORPORATION OF CONNECTICUT.

MITER-BOX SAW-GUIDE.

No. 905,067.     Specification of Letters Patent.     Patented Nov. 24, 1908.

Application filed April 18, 1908. Serial No. 427,786.

*To all whom it may concern:*

Be it known that I, CHARLES H. FOX, a citizen of the United States, residing at New Britain, Hartford county, State of Connecticut, have invented certain new and useful Improvements in Miter-Box Saw-Guides, of which the following is a full, clear, and exact description.

My invention relates to improvements in saw guides and carriers for miter boxes.

The object of the invention is to provide certain new and useful features of improvement in devices of this character, and to provide simple, attractive and effective means for properly supporting and guiding the saw.

Other advantages will be later referred to and will be apparent to the mechanic skilled in the art from a reading of the following description.

In the drawings, Figure 1 is a side elevation, partly in section, of a miter box provided with my improved saw guide and carrier; Fig. 2 is a front elevation of one of the saw guides and carriers, detached; Fig. 3 is a section of the upper part of the guide and carrier; Fig. 4 is a relatively enlarged view of the under side of the cap and latch; Fig. 5 is a relatively enlarged view of the upper end of the saw carrier, detached; Fig. 6 is a sectional view of the lower end of one of the saw guides, showing a stop mechanism in elevation and the lower end of the saw carrier; Fig. 7 illustrates details of the stop, detached.

The construction of the miter box itself is immaterial, it being sufficient that the usual table 1 be employed with the back 2, or equivalent device, the table being mounted as upon legs 3—3 and provided with a swinging arm 4, pivoted, for example at 4ª, whereby the saw guide and carrier may be adjusted to any desired angle relatively to the back 2.

5 is a tubular guide slotted longitudinally (see Fig. 2), the upper part of the slot being of a suitable width to receive the reinforcing back of the saw, such as commonly employed in miter boxes. This slot extends through both walls of the tubular part 5. The lower end of this tubular guide is suitably constructed for connection with one end of the arm 4. In this instance, 5ª is a shank arranged to project into the jaw-like gripping end 4ª of said arm.

5ᵇ is a cap detachably secured to the upper end of the tubular guide 5.

6 is a carrier slidably mounted within the tubular guide 5 and slotted longitudinally to receive the saw. This carrier 6 is movable up and down within the tubular guide 5, together with the saw. Suitable means, such as a spline, may be employed to prevent the independent rotation of the part 6 within the part 5, whereby the slots in these parts, respectively, will always be alined. The middle part of the carrier 6 is preferably slightly reduced so as to form bearings 6ª 6ᵇ at the upper and lower ends, respectively. These bearings engage the smooth inner wall of the tubular guide 5 and properly support the carrier at both ends to prevent side motion and irrespective of the elevation of the carrier within the tubular guide 5. In the preferable form, 7 is a spring-pressed pivoted latch hinged at the under side of the cap plate 5ᵇ. 8 is a press button for freeing said latch. This latch 7 is arranged to coact with a locking shoulder 7ª on the carrier 6, whereby, when the carrier is elevated to its uppermost position, it will be engaged by the latch and supported so that if the saw is in place, it will be held in an elevated position to permit the work to be conveniently adjusted upon the table 1. By merely pressing the button 8 the latch 7 is released and the saw will descend. A similar latch mechanism may be provided in the heads of both of the guides 5. If desired, a side slot may be provided, as indicated at 5ᶜ, to receive an adjustable stop, whereby the downward movement of the saw is limited.

9 is one convenient form of stop, which is arranged within the tubular member 5 and is held in place by a thumb-screw 9ª, the handle portion of which projects outside of the slot 5ᶜ, as best seen in Fig. 6.

9ᵇ is a washer through which the threaded end of the thumb-screw passes, said washer having a lip 9ᶜ arranged to slide in the groove. It is obvious that many modifications may be made in the stop construction. If desired, the side edge of the slot 5ᶜ may be graduated, as shown in Fig. 1, whereby the stop 9 may be easily set at any desired elevation to limit the descent of the carrier and hence the saw.

While it is preferable to have some means provided to prevent the rotation of the carrier within the tubular guide, the presence of such means is by no means imperative, since, if by chance, the carrier has been accidentally rotated so that the slot therein is not facing up with the slot in the guide, the user can very easily readjust the carrier to the proper position to receive the saw wherein the slots in both carrier and guide register, as shown in the drawings.

While I have shown the carrier member as arranged within the guide member, it is possible to modify the construction to reverse these positions and, to that end, I desire to have it understood that my invention in its broadest aspect should not be limited to that particular form and arrangement shown and described in detail herein.

What I claim is:

1. In a miter box, a saw guide and carrier, comprising a slotted hollow tubular guide member, a slotted hollow carrier member reduced in diameter at its middle portion and arranged wholly within said guide member and slidable therein, the slots in both of said members registering.

2. In a miter box, a saw guide and carrier, comprising a slotted hollow tubular guide member, a slotted hollow carrier member reduced in diameter at its middle portion and arranged wholly within said guide member and slidable therein, the slots in both of said members registering, and a latch carried by and within said guide member for holding said carrier member elevated therein.

3. In a miter box, a saw guide and carrier, comprising a slotted hollow tubular guide member, a slotted hollow carrier member reduced in diameter at its middle portion and arranged wholly within said guide member and slidable therein, the slots in both of said members registering, and a latch carried by and within said guide member for holding said carrier member elevated therein, and an adjustable stop carried by and within said hollow guide member for limiting the downward excursion of said carrier member.

CHARLES H. FOX.

Witnesses:
W. J. WORAM,
H. S. WALTER.